US008297034B1

(12) United States Patent
Mueller (10) Patent No.: US 8,297,034 B1
(45) Date of Patent: Oct. 30, 2012

(54) ROLLING LEAF REMOVAL DEVICE

(76) Inventor: Brett Mueller, Chattanooga, TN (US)

( * ) Notice: Subject to any disclaimer, the term of this patent is extended or adjusted under 35 U.S.C. 154(b) by 0 days.

(21) Appl. No.: 13/211,114

(22) Filed: Aug. 16, 2011

(51) Int. Cl.
*A01D 7/00* (2006.01)

(52) U.S. Cl. .............. 56/400.02; 56/400.03; 172/21

(58) Field of Classification Search .......... 56/400.02, 56/400.03; 172/21, 22
See application file for complete search history.

(56) References Cited

U.S. PATENT DOCUMENTS

| | | | |
|---|---|---|---|
| 1,898,214 A * | 2/1933 | Richards | 111/118 |
| 4,219,994 A | 9/1980 | Ciscon | |
| 4,299,079 A | 11/1981 | Lambert | |
| 4,516,393 A | 5/1985 | Lambert | |
| 4,635,429 A | 1/1987 | Cornelius | |
| 4,821,500 A | 4/1989 | MacIvergan | |
| 5,134,837 A | 8/1992 | Casey et al. | |
| 5,274,989 A | 1/1994 | Ng | |
| 5,479,768 A | 1/1996 | Hettich | |
| 5,509,259 A | 4/1996 | Milbury | |
| 5,611,291 A * | 3/1997 | Pogue | 111/14 |
| 5,613,565 A * | 3/1997 | Kelly | 172/21 |
| 5,632,342 A * | 5/1997 | Knoblich et al. | 172/21 |
| 5,743,076 A | 4/1998 | Ng | |
| 5,974,771 A | 11/1999 | Greenan | |
| 7,762,052 B2 | 7/2010 | Dunning et al. | |
| 7,810,202 B2 | 10/2010 | Fitzgerald | |
| 2004/0123579 A1 | 7/2004 | Schutz | |
| 2004/0221557 A1 | 11/2004 | Dunning et al. | |
| 2007/0169290 A1 | 7/2007 | Fitzgerald | |
| 2007/0220857 A1 | 9/2007 | Derby | |
| 2009/0071115 A1 | 3/2009 | Freewalt | |
| 2009/0282795 A1 | 11/2009 | Batchelder et al. | |
| 2010/0287903 A1 | 11/2010 | Hammad | |

* cited by examiner

*Primary Examiner* — Alicia Torres
(74) *Attorney, Agent, or Firm* — Clifford Kraft (57) ABSTRACT

A hand-operated, rolling leaf-rake that is rolled over leaves or other debris to collect the leaves or debris for disposal. It employs rolling drums with retractable spikes that puncture and collect leaves or debris as the tool is pushed along the ground. The drums are comprised of an inner assembly covered with spikes that rise and protrude through holes in the outer drum as it is rolled, and alternately retract through the holes and drop back down to rest again on the inner cylinder. As the spikes retract, the leaves/debris are left deposited on the ground and can be removed. The spikes are under control of a lock mechanism.

8 Claims, 9 Drawing Sheets

ROLLING LEAF REMOVAL DEVICE

BACKGROUND OF THE INVENTION

1. Field of the Invention

The present invention relates generally to mechanical rakes used in picking up leaves and other debris and more particularly to a rolling leaf removal device.

2. Description of the Prior Art

Prior art inventions, cited below, do not employ mechanical rolling drums with spikes, in which the spikes pick up leaves/debris. These devices also do not have a mechanism for depositing the leaves and debris.

The following prior art patents teach various rakes:
U.S. Pat. No. 4,821,500
MacIvergan
Apr. 18, 1989
Raking Means A lawn rake which comprises a main body portion supported by wheels. A plurality of broad, closely spaced gathering tines formed from a sheet of spring steel or other resilient material extend downwardly and rearwardly from the main body portion. These tines are forwardly disposed at their lower end to engage the ground to gather pine needles, grass clippings and leaves when the rake is pushed forward, and to pass over such debris when the rake is pulled backward. When the rake is pulled backward, debris previously gathered by the gathering tines is transferred to a second set of tines disposed forwardly of the gathering tines. These pusher tines keep the gathered pine needles, grass clippings, etc., in front of the gathering tines thereby preventing the same from clogging with debris.

U.S. Pat. No. 5,274,989
Jan. 4, 1994
Rotary Rake-Type Leaf Collector

A lawn-cleaning device for picking up debris, comprising a rolling drum and spikes, tines and the like for collectively piercing leaves and the like includes an improved means for periodic protrusion and retraction of the spikes, tines or the like through spaced apart suitably-shaped openings in the rolling drum. Leaves and the like are pierced for collection on the spikes during protrusion and debris pierced by the spikes is released from the spikes and collected in a debris receiver during retraction. The improved means includes an array of spaced-apart spikes extending radially from a cylindrical element that is rotational about its cylindrical axis and is supported inside the rolling drum with its axis of rotation parallel to the axis of rotation of the drum. The spikes are adapted to retractable protrusion from the interior through spaced-apart openings in the cylindrical wall of the drum, whereby both the cylindrical element and the drum rotate in the same rotational sense with each one of the spikes periodically penetrating through and retracting through openings in the wall of the rotating drum.

U.S. Pat. No. 5,509,259
Milbury
Apr. 23, 1996
Lawn Debris Rake and Collection Device An array of tines are carried by a frame assembly so that the tines of the tine array are spaced one from the other across the assembly and so that ends of alternate tines form two rows of tine ends. The frame assembly is made of hollow pipe rods connected together by elbows, pipe, connectors and "T"s and so that one end of each tine is lodged in a first rod and the tines extend through a second rod. A bias rod extends across the tines and is spring urged against the tines proximate free ends thereof. Prongs, either separately formed, or extensions of the tines extend out from the frame assembly in a direction opposite to that of the tines. A removable push handle is pivotally carried by the frame assembly for movement between a first or raking disposition and a second or collection disposition. The push handle, when removed, is disposable on the frame which may thereafter be carried by a carry handle also secured to the frame assembly.

U.S. Pat. No. 5,743,076
Apr. 28, 1998
Rotary-Type Debris Collector

A lawn-cleaning device for picking up debris wherein flexible and deformable belts are used in an easily configurable compact structure whereby leaves and the like are pierced by spikes, tines or the like in repetitive motions of protrusion and retraction. Tines mounted on an inner belt protrude through spaced-apart suitably-shaped openings in an enclosing rotational member whereby debris is pierced for collection on the tines. Collected debris is automatically removed from the tines and collected in a debris receiver during retraction of the tines. The improvement comprises use of an inner belt provided with an array of outwardly-extending spaced-apart tines, constrained to move in a first pre-defined circuit within a second pre-defined circuit of an outer belt. The tines are adapted to retractable protrusion outwardly through spaced-apart openings in the outer belt, while both belts are moving in the same directional sense at the same linear speed, in an extended region where the inner belt and the outer belt are in contact U.S. Pat. No. 7,810,202
Fitzgerald
Oct. 12, 2010
Leaf and Debris Sweeper A debris collecting device includes a rotatable drum 4 having a plurality of radially extending tynes 5 and a rake adapted to cooperate with the drum, the rake having dual arcuate shaped blades, including a debris releasing blade 7 and a reversing blade 9 adapted to contiguously contact either side of the drum over the whole length thereof at the respective leading edges thereof. The blades include elongate slots 11 adapted to intersect and accommodate the travel path of the tynes as the drum rotates such that debris pierced and picked up by the tynes rotating in a first direction is dislodged for transfer to a catcher 2.

U.S. Pat. No. 4,217,672
Olivari
Aug. 19, 1980
Debris Picker and Bagger

The invention is an improved device for picking leaves, pine needles, and other debris from a lawn and bagging them for disposal. The device operates by the movement of a pair of wheels across the lawn, which in turn, by geared means, revolves a shaft carrying a plurality of rake-like tines or fingers. The rake-like members, on the revolving shaft, sweep and pick up leaves and other debris from a lawn and move them upward within the housing of the device. The rake-like members extend outwardly from the shaft and the ends pass through apertures in a drum. The drum is off-center in relation to the shaft of the rake-like members so that in the revolving of the mechanism the ends of the rake-like members move back and forth through the apertures in the drum. The leaves and other debris are moved and compacted into a disposal bag mounted to the upper side of the mechanism. The filled disposal bag is easily removed and replaced by an empty bag. Handle means are provided for manually pushing the device.

U.S. Pat. No. 4,219,994

Ciscon

Sep. 2, 1980

Adjustable Pivoting Hand Rake

A pivoting-pull type hand rake with a rake tyne assembly and wheels on each side thereof rollably supporting the rake tyne assembly to the wheel axles. Adjustable means, including apertures along the bracket enable the operator to pre-set and adjust the maximum ground penetration by the tynes.

U.S. Pat. No. 4,299,079

Lambert

Nov. 10, 1981

Machine for Raking or Sweeping

A pair of laterally spaced, upwardly extending arms are pivotally attached at their lower ends to the sides of a wheeled frame for oscillatory movement about a horizontal axis. A transverse member is pivotally connected to the upper ends of the arms. A trio of rearwardly and downwardly extending arms are secured at laterally spaced locations to the transverse member and are oscillatable about an elevated horizontal axis, each of the last-mentioned arms having a sweeping unit in the form of a lawn rake or bristled broom attached to its rear or free end. Still another arm extends forwardly from the transverse member and has its forward end pivotally connected to a power-operated crank. As the machine is moved across the surface to be swept, as when raking a lawn, the rakes are repeatedly dragged forwardly, raised and then lowered so as to form a windrow of leaves and other debris. The movement of the rakes or brooms is at a much faster rate than the machine is pushed so that the ground is effectively raked or swept. A clutch arrangement permits the raking of sweeping movement to be halted at any time under the control of the walk-behind operator.

U.S. Pat. No. 5,974,771

Greenan

Nov. 2, 1999

Raking Apparatus

The present invention provides a cylindrical rake for use in a raking apparatus wherein the cylindrical rake comprises first and second end members spaced apart from one another along the axis of the cylindrical rake, a plurality of circumferentially spaced elongated tine carrying members which extend between and are carried by first and second end members mounting devices for mounting the rake on a suitable carriage thereof, and a driven device adapted to be driven for rotating the rake about its axis in use. The tine carrying members carry a plurality of tine elements thereon; characterized in that each tine element is constituted by a length of wire which is formed into two axially spaced coils, a respective neighboring two of the tine carrying members being inserted one each through the two coils for carrying the tine element on the two respective tine carrying members, and each tine element has at least one free end of the wire which extends outwardly of the cylindrical rake for engaging the ground in service. The invention also provides a raking apparatus comprising such a cylindrical rake, a carriage device adapted for translational movement over the ground and a rotating device for rotating the cylindrical rake.

U.S. Pat. No. 7,762,052

Dunning, et al.

Jul. 27, 2010

Roller-Supported Accumulator for Lawn and Garden Debris

An apparatus for collection of yard debris combines a vacuum pick up with a blower unit, a separator, and a detachable accumulator with an attached roller to support the accumulator upon detachment from the separator. The apparatus collects and entrains debris in an airflow induced at the vacuum pickup, impels the debris to the separator which removes the debris from the airflow, and deposits it in the accumulator which is supported by a roller to aid subsequent dumping when the accumulator is detached.

U.S. Pat. No. 5,134,837

Casey, et al.

Aug. 4, 1992

Crop-Pickup and Seed-Harvesting Device

A crop-pickup device including a rotatable drum or cylinder with pickup teeth thereon associated with a rake plate or notched stripping panel associated with the pickup teeth to effectively strip the plants from the pickup and collect and guide the seeds which may fall from the plants into the conveyor of the harvesting machine. A transverse manifold with a rearwardly facing slot-like opening is located forwardly of the pickup drum and teeth to prevent the plants from rolling forwardly when they are engaged by the pickup teeth and a pair of side blowers discharge air laterally inwardly and rearwardly which also prevent the plants from rolling forwardly and keep the windrow from fanning out or rolling outside of the pickup drum and teeth.

U.S. Pat. No. 4,516,393

Lambert

May 14, 1985

Wheeled Push Rake

The push rake includes two pivotally connected frame units. A plurality of broom rakes are mounted on the first frame unit. A spring mechanism becomes loaded as the rake is manually pushed across the ground in forming a windrow, the stored spring energy being automatically released when the user stops pushing.

U.S. Pat. No. 4,635,429

Cornelius

Jan. 13, 1987

Windrow Yard Rake

An improved windrow yard rake useful for the raking of leaves, garden debris and the like. The rake has an adjustable drawbar to allow for the angling of the partially cylindrical main rake body so that the accumulated debris will circulate to the outermost end of the rake relative to the operator. The drawbar is also vertically adjustable in order to achieve a comfortable angle of approach to the operator. Wheels are attached to the top rear corner of the main rake body in such a way that if the rake is turned over on its top the rake is easily transported by rolling it on the wheels. Four pockets are provided on the rear of the rake to allow for weighted materials to be deposited in order to increase the overall weight of the rake itself. A lid is also provided to prevent loss of weighted materials upon transporting the rake via the wheels.

U.S. Pat. No. 5,479,768

Hettich

Jan. 2, 1996

Turf-Care Implement

A turf-care implement includes a frame mounted on a pair of opposed wheels. The frame supports a pair of lift arms which are mounted at an angle to the direction of travel of the implement. The lift arms support a plurality of rakes on mounting arms. The radial-type wheel rakes which have tines extending radially outward from a central hub. A series of cables and pulleys connects from the lift arms to a lift handle by a forward portion of the frame for raising and lowering the arms and positioning the arms at various heights.
United States Patent Application
20090071115
Freewalt; James L.
Mar. 19, 2009
Air-Powered Rotary Rake The air-powered rotary rake is an attachment for a leaf blower or the like, providing the user with air-powered rotary blades to dislodge or agitate debris which, ordinarily, could not be moved easily with air blowing alone. The air-powered rotary rake includes a housing defining an open interior region and having opposed open front and rear ends. The rear end is adapted for releasable attachment to the leaf blower.
United States Patent Application
20090282795
Batchelder; Rachael Anne; et al.
Nov. 19, 2009
Blower and Rotary Rake for Debris Herding A debris-herding method and apparatus comprising a low-power air blower and a tilted rotary rake. The air blower acts together with a tilted rotary rake to dislodge and impel the debris. A motor driven chassis transports the blower and the rotary rake across the lawn. The blower and rotary rake can be energetically powered, such as by a solar cell array mounted to the chassis.
United States Patent Application
20100287903
Hammad; Adnan A.
Nov. 18, 2010
Leaf-Gathering Apparatus A leaf-gathering apparatus includes upper and lower conveyor axes, a conveyor extending around the upper and lower conveyor axes that is continuously rotatable, and a rotatable sweeping mechanism having a generally horizontal axis of rotation, the sweeping mechanism being configured to move leaves from a ground surface onto the conveyor. The apparatus includes a bag and a channel extending from the conveyor to the bag to direct leaves therebetween. A shredder is located along the channel.
United States Patent Application
20070220857
Derby; R. Douglas
Sep. 27, 2007
Mechanical Leaf-Raking and Bagging Device A wheeled machine that rakes lawns and other surfaces to remove leaves, pine needles and other lightweight debris and conveys this material directly into a standard size plastic bag for disposal or transport to a composting location.
United States Patent Application
20070169290
Fitzgerald; Eddie
Jul. 26, 2007
Leaf and Debris Sweeper A debris-collecting device includes a rotatable drum having a plurality of radially extending tynes and a rake adapted to cooperate with the drum, the rake having dual arcuate shaped blades, including a debris releasing blade and a reversing blade adapted to contiguously contact either side of the drum over the whole length thereof at the respective leading edges thereof. The blades include elongate slots adapted to intersect and accommodate the travel path of the tynes as the drum rotates such that debris pierced and picked up by the tynes rotating in a first direction is dislodged for transfer to a catcher/

United States Patent Application
20040221557
Dunning, Charles Everett, et al.
Nov. 11, 2004
Collector and Separator Apparatus for Lawn and Garden An apparatus for collection and reduction of twig-containing yard debris combining a frontally facing twig breaker with a chipper-shredder-blower unit to induce airflow for entraining debris collected at the vacuum pick up; reduce the entrained debris to a more manageable volume; and impel the reduced debris to a free-flow-separator device for removing the debris from the air in which it is entrained.
United States Patent Application
20040123579
Schutz, A. James
Jul. 1, 2004
Stick Rake A machine for gathering sticks and other yard refuse from a ground surface. The machine includes a gathering device and a collection basket for collecting and holding yard refuse from a ground surface. The gathering device includes a frame that supports an elongated rotor and a gasoline engine for driving the rotor about its longitudinal axis. The elongated rotor includes a plurality of axially spaced tines mounted thereon that extend perpendicular to the longitudinal axis and operative to gather the yard refuse from the ground surface and deposit it into the collection basket as the gathering device is moved over the ground surface.

SUMMARY OF THE INVENTION

It is an object of this invention to provide a hand-operated, rolling leaf-rake that is rolled over leaves or other debris to collect the leaves or debris for disposal. A further object is to aerate soil by rolling over it. The rolling leaf removal device of the present invention is adapted to aerate soil without any modifications over its use as a leaf and debris rake.

The Rolling Leaf-Removal Device (RLRD) is a garden/debris tool that employs rolling drums with retractable spikes that puncture and collect leaves or debris as the tool is pushed along the ground. The device's two drums are comprised of an inner assembly covered with spikes that rise and protrude through holes in the outer drum as it is rolled, and alternately retract through the holes and drop back down to rest again on the inner cylinder. As the spikes retract, the leaves/debris are left deposited on the ground and can be removed.

Other objects of the present invention, as well as particular features, elements, and advantages thereof, will be shown in the following description and accompanying figures.

The scope of the present invention is not limited to what is shown in the figures.

DESCRIPTION OF THE PREFERRED EMBODIMENT

Figure 1:
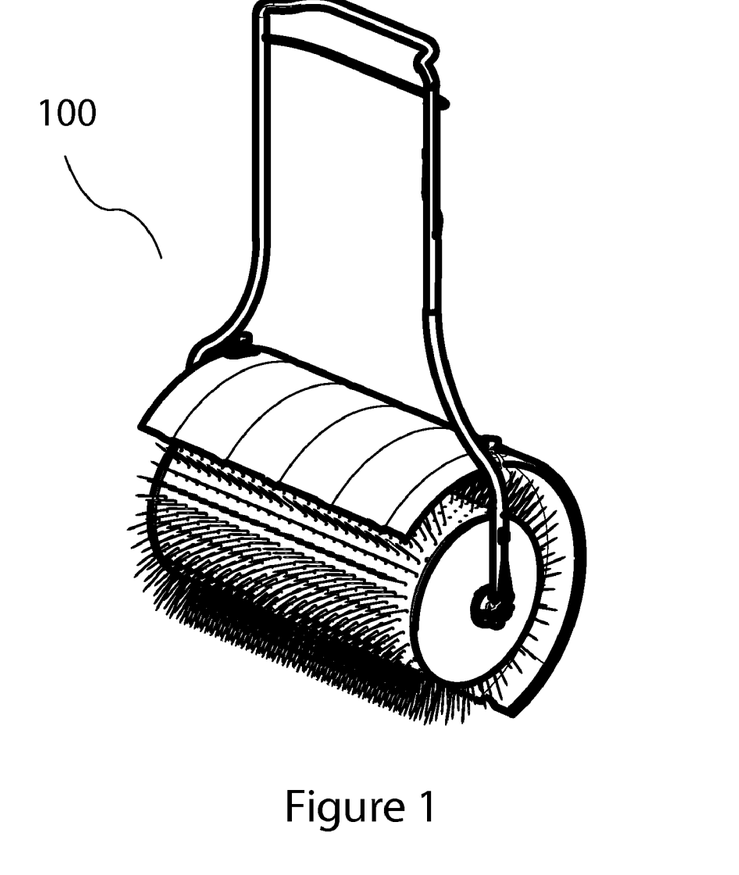
FIG. 1 an isometric view of the embodiment.
Figure 2:
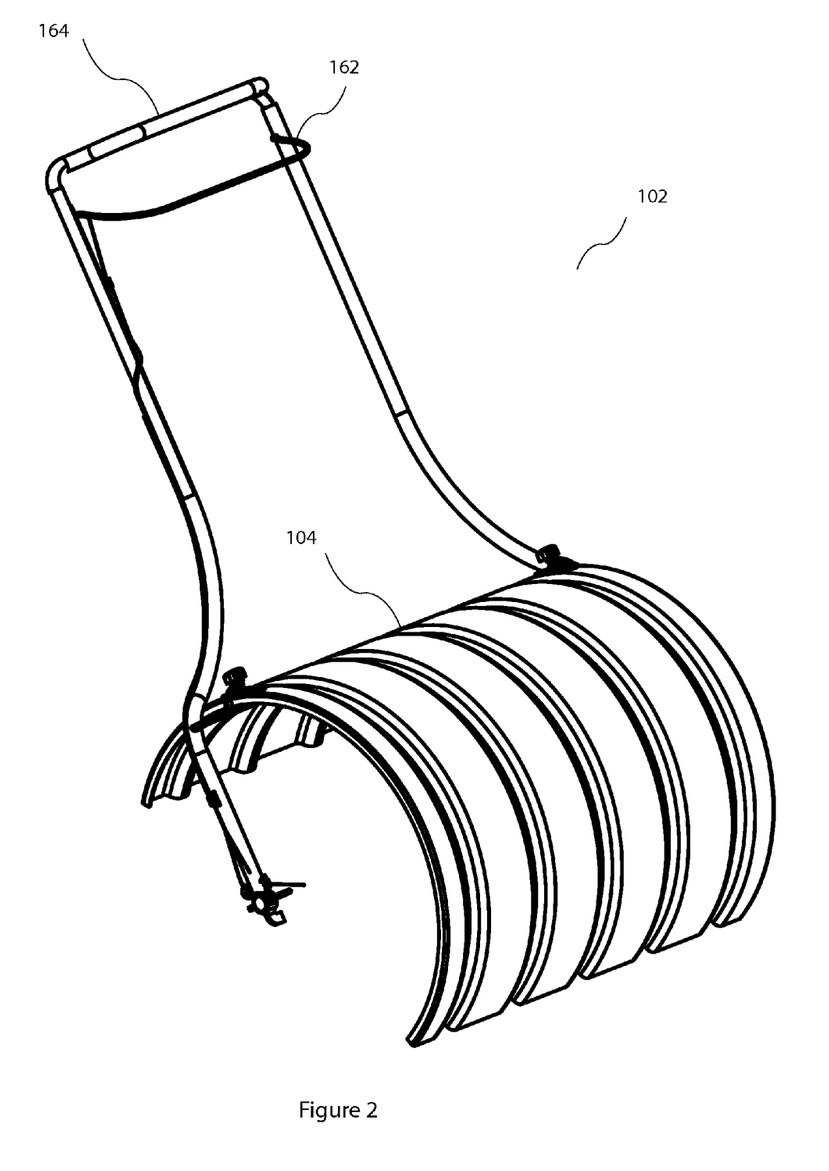
FIG. 2 is an isometric view showing the frame assembly of the embodiment.
Figure 3:
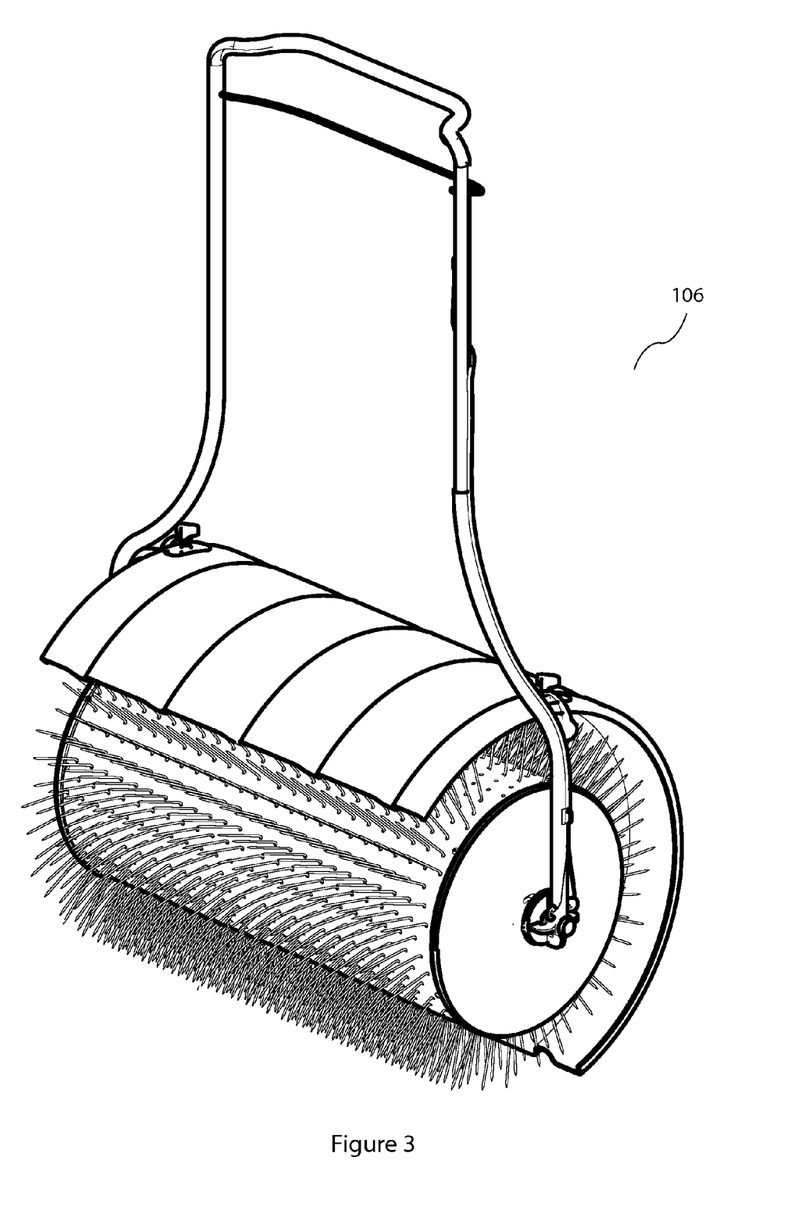
FIG. 3 is a perspective view of the embodiment's drum assembly.
Figure 4:
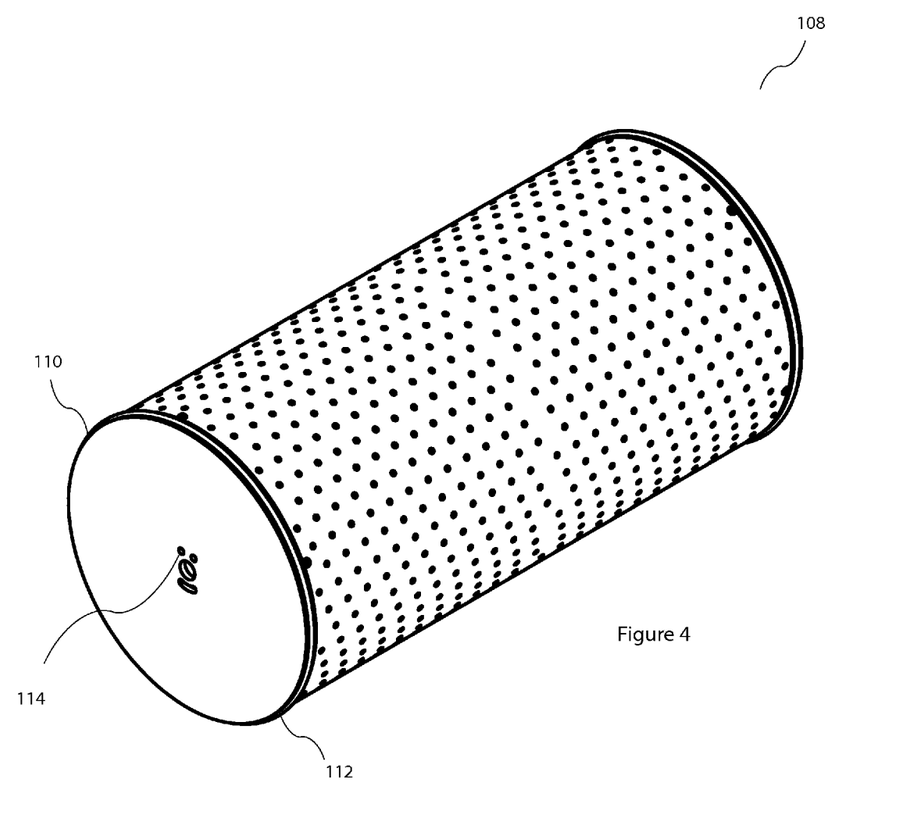
FIG. 4 is a perspective view of the outer drum/cylinder.
Figures 5, 5B:
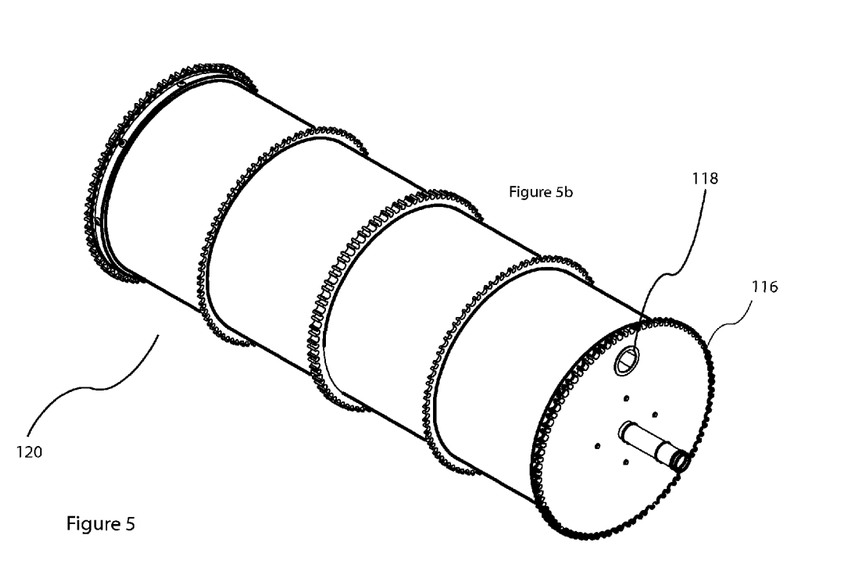
FIGS. 5, 5a and 5b are isometric views of the same inner drum/cylinder plus parts.
Figure 5A:
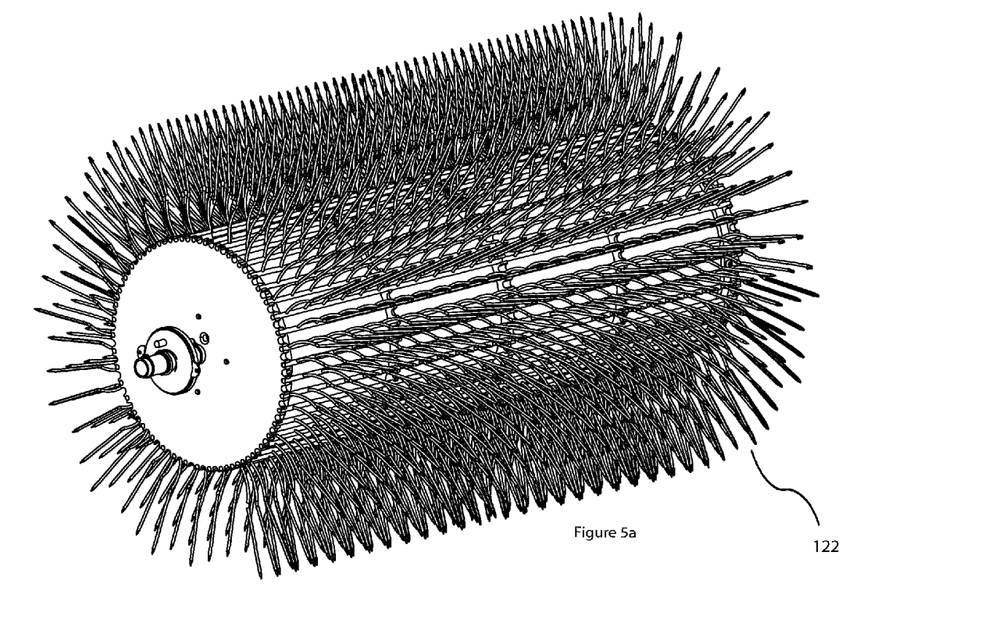

A particular embodiment of the present invention is illustrated in FIGS. 1-9. Referring to FIG. 1, the object of the present disclosure is a rolling leaf-rake device 100. FIG. 2 shows that the embodiment is comprised of an outer frame assembly 102 with a safety shell 104. The frame assembly is engaged by axle to the drum assembly FIG. 3, 106. The drum assembly is comprised of two cylinders: an outer cylinder FIG. 4 108 with holes for the spikes to go through during operation, and an inner cylinder FIG. 5, 122 with spikes. On each of the two end caps FIG. 4, 110 is a groove 112 for a large o-ring, which is used for traction and to protect the outer cylinder on hard surfaces while the spikes are retracted. Two locking holes 114 are used in the locking mechanism shown in detail in FIG. 8. The inner cylinder cap FIG. 5 116 has a large fill hole 118 so that the inner cylinder can be filled with water in order to increase the weight of the cylinder. FIG. 5 shows two views of the inner cylinder assembly; 120 is a view without spikes and 122 is a view of the inner drum with its spikes.

Figures 6, 6A, 6B:
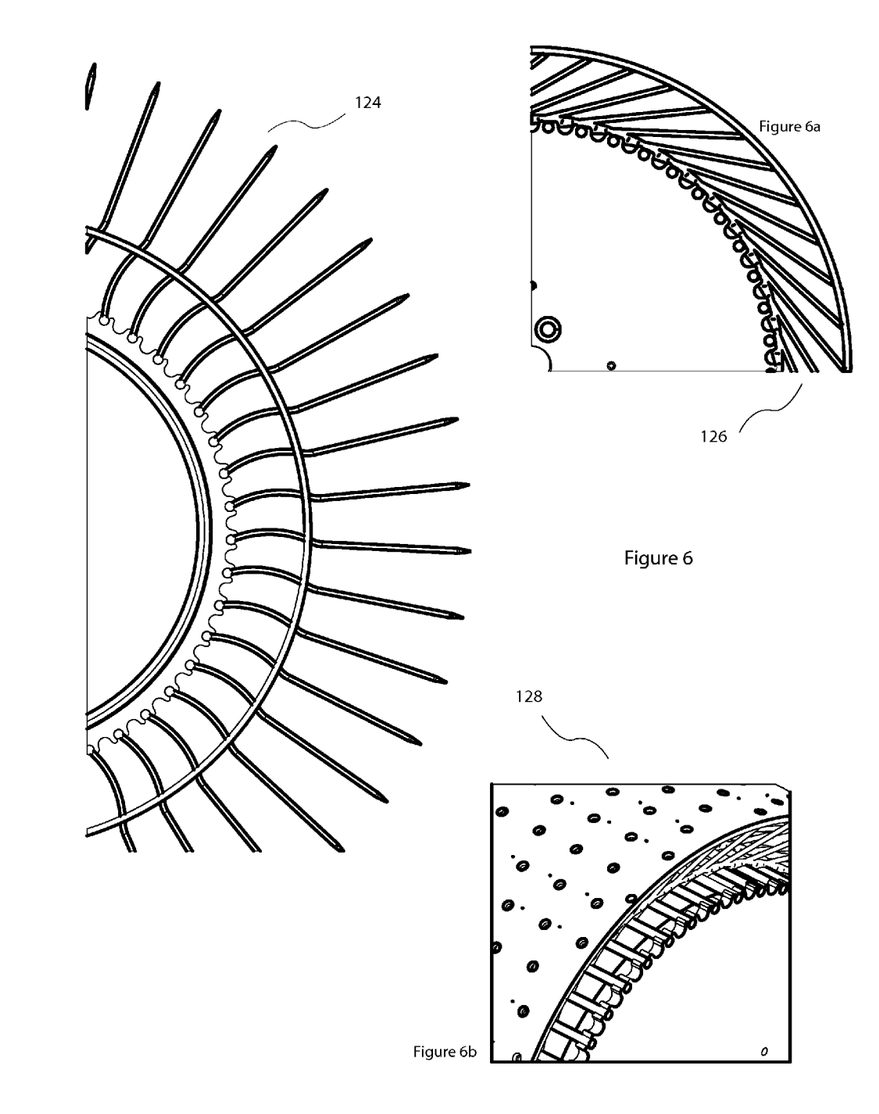
FIGS. 6, 6a and 6b are detailed views of the spikes in various positions.

FIG. 6 is an exploded view of the spikes in their up or extended position 124; retracted or down position 126; and retracted and lying against the inner drum 128.

Figures 7, 7A:
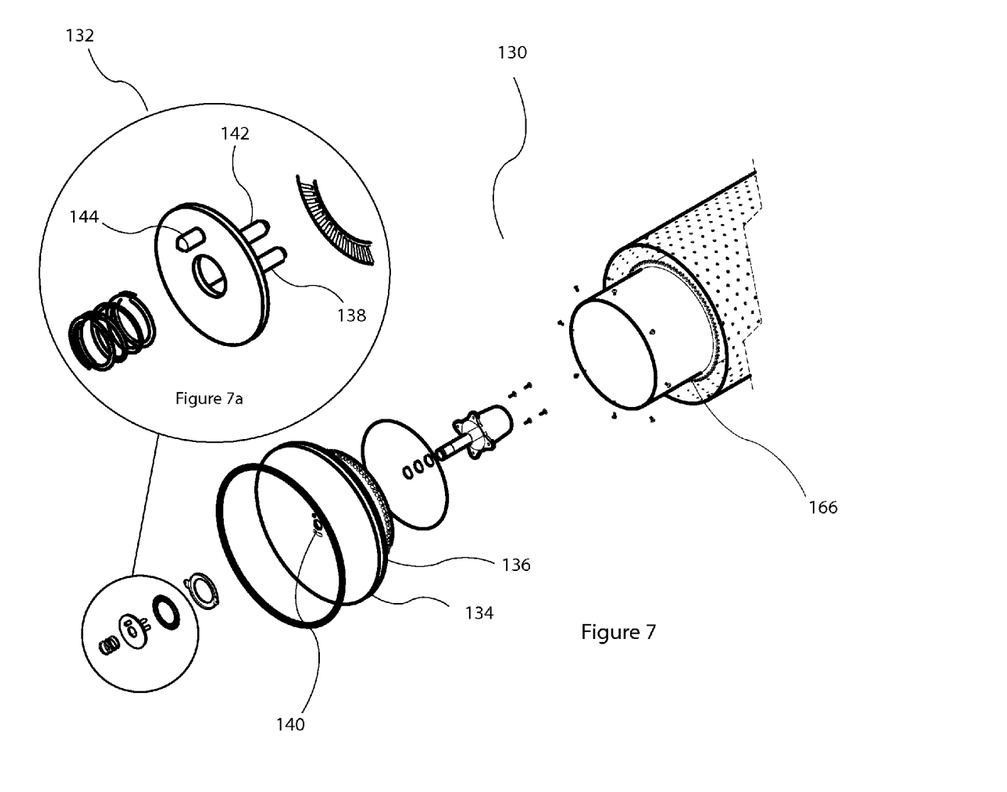
FIGS. 7 and 7a are exploded view of the inner parts and an exploded, detailed view of the locking mechanism.

FIG. 7 is an exploded view of the inner drum and locking mechanism 130 and a detailed view of the locking mechanism 132. In the locked position the lock is pressed through the outer cylinder locking cap 134 into the inner cylinder locking cap 136. The long rod 138 on the lock is at all times set into both cylinder caps. A slot 140 in the outer cylinder cap allows for the outer cylinder FIG. 4 108 to rotate; which, depending on the direction, will force the prongs to move in or out of the holes in the outer cylinder. The short rod FIG. 7 142 on the lock is used to lock the two cylinders together, which results in either extended or retracted spikes. The small, opposing rod on the other side of the lock 144 is the main handle/cylinder coupler, used to lock the inner cylinder and main handle FIG. 9 154 together to keep the inner cylinder from rotating freely while extending or retracting the spikes.

Figures 8, 8A:
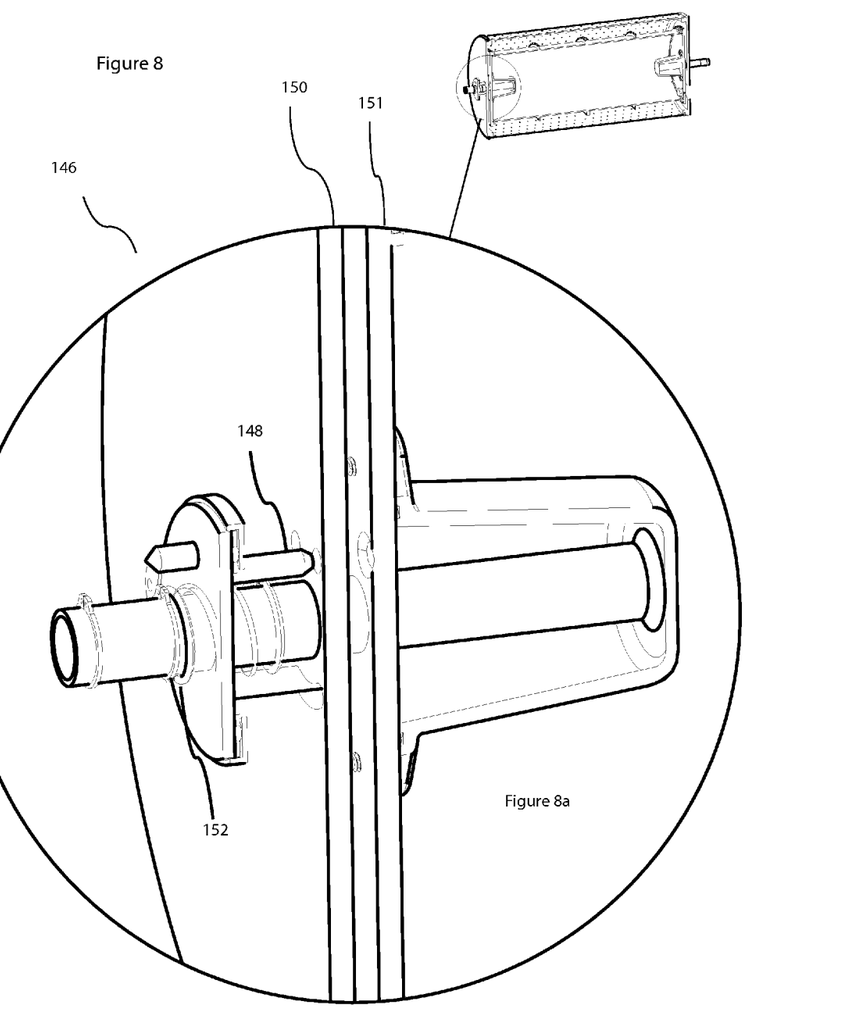
FIGS. 8 and 8a are a section view and an exploded section view of the locking mechanism.

FIG. 8 146 is an exploded, cutaway view of the locking assembly. The long lock rod 148 is shown going through the outer cylinder 150 and fixing to the inner cylinder 151 while allowing the outer cylinder to rotate. A spring or springs 152 keeps the lock in place during use.

Figures 9, 9A, 9B, 9C:
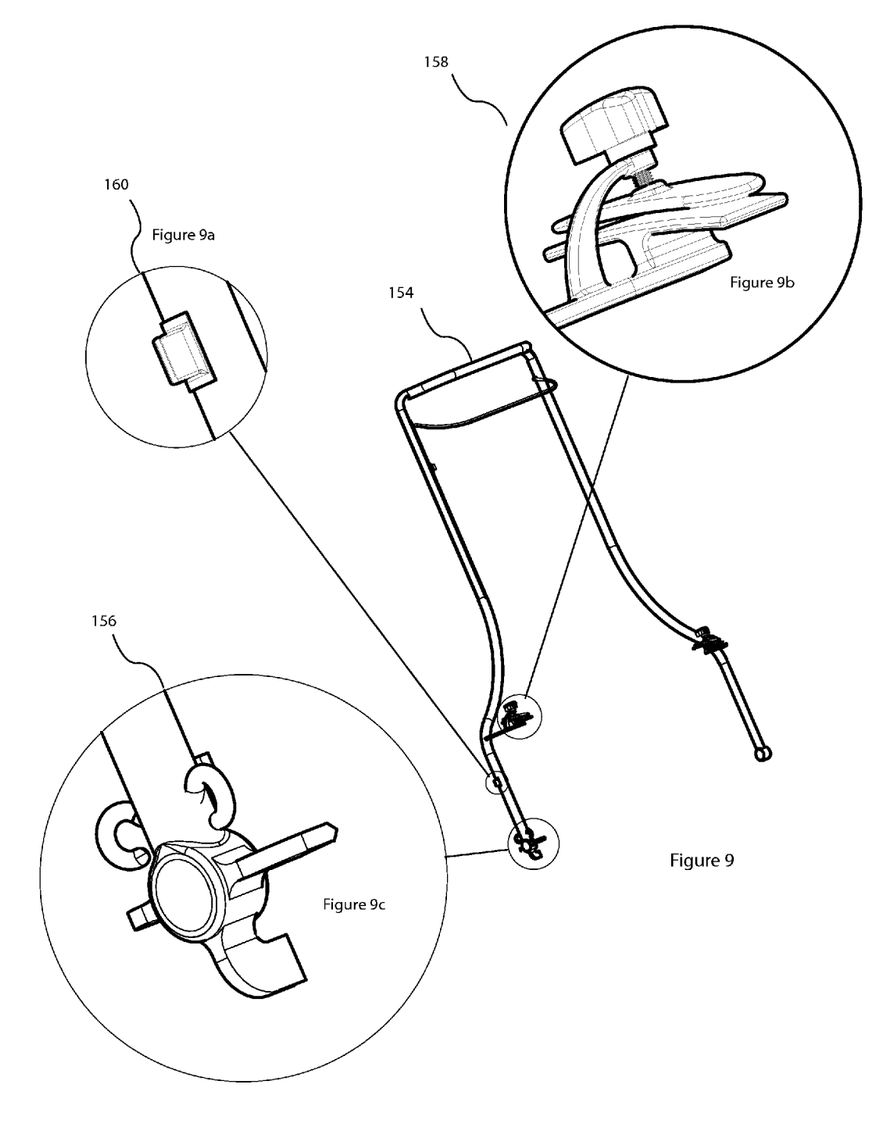
FIGS. 9, 9a, 9b and 9c are exploded views and detailed views of the handle and its parts.

FIG. 9 shows the embodiment's handle 154, with cable management device 156, safety-guard support base 158, and cable holder 160. The user generally pulls the lever FIG. 2, 162 on the handle FIG. 2, 164 which is engaged with the positional lock (short rod) FIG. 7, 142, pulling it out of the inner cylinder FIG. 7, 166 allowing the outer cylinder FIG. 8, 150 to rotate freely into the next position. When the spikes are fully extended or retracted as the user releases the lever FIG. 2, 162, which pushes the long locking rod FIG. 7, 138 back into position.

Several descriptions and illustrations have been presented to aid in understanding the present invention. One with skill in the art will realize that numerous changes and variations may be made without departing from the spirit of the invention. Each of these changes and variations is within the scope of the present invention.

The invention claimed is:

1. A rolling leaf rake comprising:
   an inner drum coaxial with an outer drum, said drums adapted to rotate about a common axis, said drums under control of a locking mechanism, wherein, in a first position of the locking mechanism, the drums are locked together and rotate together, and in a second position of the locking mechanism, the drums can rotate a fixed distance relative to one another between a first relative position and a second relative position;
   a plurality of spikes attached to said inner drum;
   a plurality of holes in said outer drum;
   wherein, in the first relative position, the spikes on the inner drum protrude through the holes in the outer drum, and in the second relative position, the spikes on the inner drum do not protrude through the holes in the outer drum.

2. The rolling leaf rake of claim 1 wherein said inner drum is adapted to be filled with a liquid.

3. The rolling leaf rake of claim 1 further comprising an outer shield partly concentric with said drums.

4. The rolling leaf rake of claim 1 further comprising a means for preventing said inner drum from rotating when said drums rotate between the first relative position and the second relative position.

5. A rolling leaf rake comprising:
   an inner drum coaxial with an outer cylinder, said drum and cylinder adapted to rotate about a common axis, said drum and cylinder under control of a locking mechanism, wherein, in a first position of the locking mechanism, the drum and cylinder are locked together and rotate together, and in a second position of the locking mechanism, the drum and cylinder can move a fixed distance relative to one another between a first relative position and a second relative position;
   a plurality of spikes attached to said drum;
   a plurality of holes in said cylinder;
   wherein, in the first relative position, the spikes on the drum protrude through the holes in the cylinder, and in the second relative position, the spikes on the drum do not protrude through the holes in the cylinder.

6. The rolling leaf rake of claim 5 wherein said drum is adapted to be filled with a liquid.

7. The rolling leaf rake of claim 5 further comprising an outer shield partly concentric with said drum and cylinder.

8. The rolling leaf rake of claim 5 further comprising a means for preventing said drum from rotating when said drum and cylinder rotate between the first relative position and the second relative position.

\* \* \* \* \*